(12) United States Patent
Jefferson

(10) Patent No.: US 7,174,852 B2
(45) Date of Patent: Feb. 13, 2007

(54) ATTACHMENT FACILITATING DEVICE FOR A BICYCLE

(75) Inventor: Malcolm Jefferson, Ottawa (CA)

(73) Assignee: Canada, Inc, Ottawa (CA)

( * ) Notice: Subject to any disclaimer, the term of this patent is extended or adjusted under 35 U.S.C. 154(b) by 0 days.

(21) Appl. No.: 11/424,494

(22) Filed: Jun. 15, 2006

(65) Prior Publication Data

US 2006/0219186 A1  Oct. 5, 2006

Related U.S. Application Data

(62) Division of application No. 11/148,498, filed on Jun. 9, 2005.

(30) Foreign Application Priority Data

Jun. 11, 2004  (CA) ..................................... 2471149

(51) Int. Cl.
*A01K 1/00* (2006.01)
(52) U.S. Cl. ....................... 119/496; 119/771; 280/202; 280/304.5
(58) Field of Classification Search ............... 119/28.5, 119/453, 496, 771; 280/202, 304.5
See application file for complete search history.

(56) References Cited

U.S. PATENT DOCUMENTS

| 453,212 | A | 6/1891 | Sager |
|---|---|---|---|
| 460,031 | A | 9/1891 | Rastetter et al. |
| 3,515,431 | A | 6/1970 | Grady |
| 3,738,704 | A | 6/1973 | Smith et al. |
| 4,305,532 | A | 12/1981 | Reminger |

(Continued)

FOREIGN PATENT DOCUMENTS

DE  811323  8/1951

(Continued)

OTHER PUBLICATIONS

European Search Report for Appln. No. EP05/012570, dated Aug. 18, 2005 (pp. 3).

*Primary Examiner*—Robert P. Swiatek
(74) *Attorney, Agent, or Firm*—Conley Rose, P.C.

(57) ABSTRACT

An attachment facilitating device and a pet carrier for a bicycle. The attachment facilitating device is an elongate support for a bicycle-mounted carrier that mounts between the saddle and the handlebars of a bicycle. The support includes first and second ends. A first clamp is associated with the first end for gripping a tubular, member of the bicycle adjacent to the handlebars. A second clamp is associated with the second end for gripping a tubular member of the bicycle rearwardly of the first clamp. First and second elongate arms are slideably engageable with each other The first and second arms each have a proximal end region opposite their respective distal end regions associated with the clamps. The first arm is for supporting the carrier and is fastenable thereto. The second arm includes a linear region extending from the distal end of the second arm towards the proximal end of the second arm. An angled region is adjacent the linear region. At least two fasteners enable fastening of the first and second arms together in either of at least two orientation-differing relationships. In one of the two relationships, angling out from the linear region is in one direction. In the other of the relationships, angling out from the linear region is in a different direction.

10 Claims, 12 Drawing Sheets

U.S. PATENT DOCUMENTS

| | | |
|---|---|---|
| 4,632,453 A | 12/1986 | Robbin et al. |
| 4,919,479 A | 4/1990 | Loewke et al. |
| 4,964,551 A | 10/1990 | O'Donovan et al. |
| 4,969,658 A | 11/1990 | Levarek et al. |
| 5,104,188 A | 4/1992 | Jefferson |
| 5,149,112 A | 9/1992 | Nauman et al. |
| 5,215,037 A * | 6/1993 | Allred ........................ 119/771 |
| 5,330,215 A | 7/1994 | Bishaf et al. |
| 5,467,906 A | 11/1995 | Forman |
| 5,577,646 A * | 11/1996 | White ........................ 224/422 |
| 5,927,801 A | 7/1999 | Miree |
| 6,264,223 B1 | 7/2001 | Loewke et al. |
| 6,435,523 B1 | 8/2002 | Hilk |
| 6,471,232 B2 * | 10/2002 | Huang ..................... 280/304.5 |

FOREIGN PATENT DOCUMENTS

| | | |
|---|---|---|
| JP | 07269543 | 10/1995 |
| WO | 01/68438 | 9/2001 |

* cited by examiner

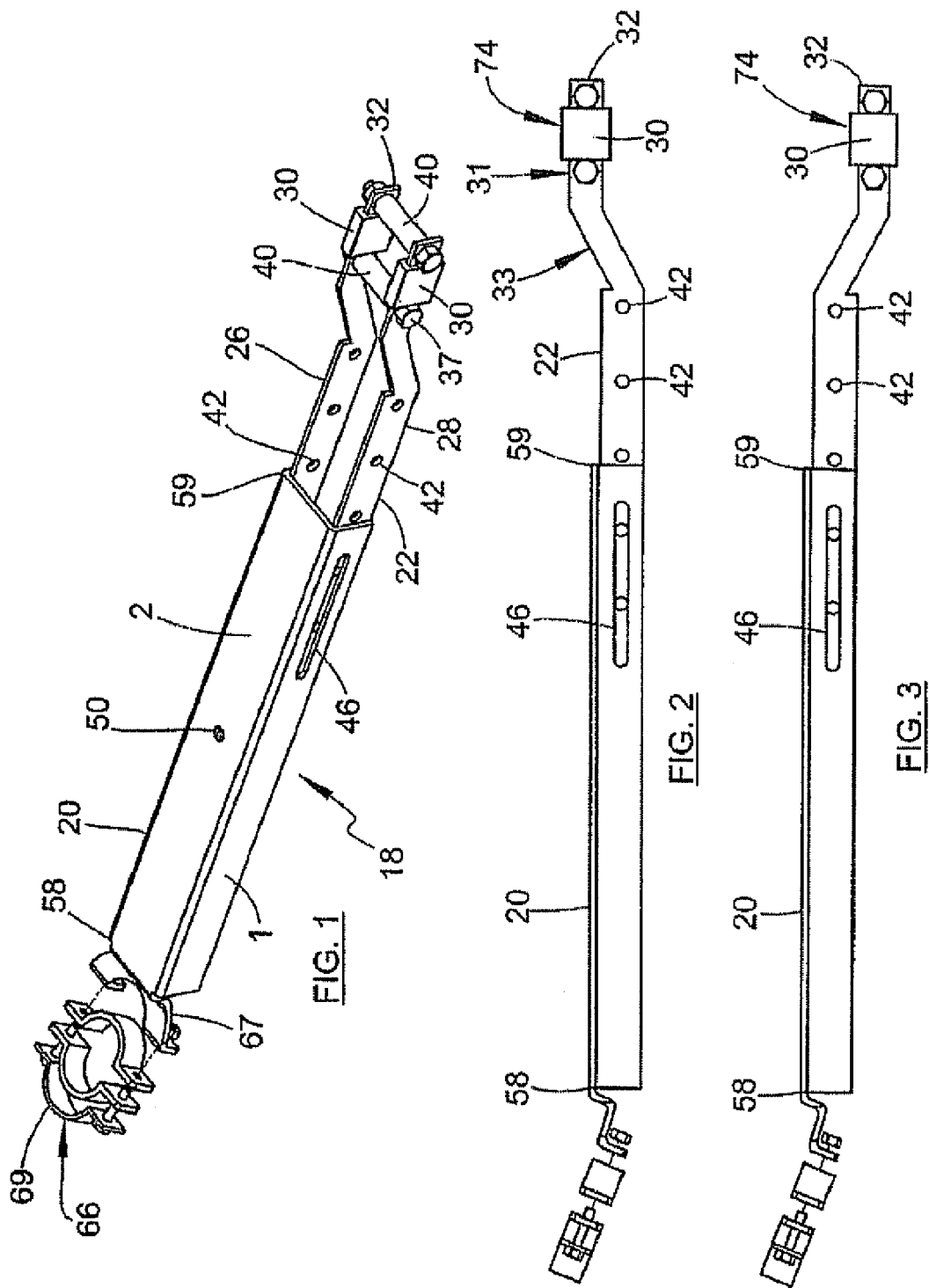

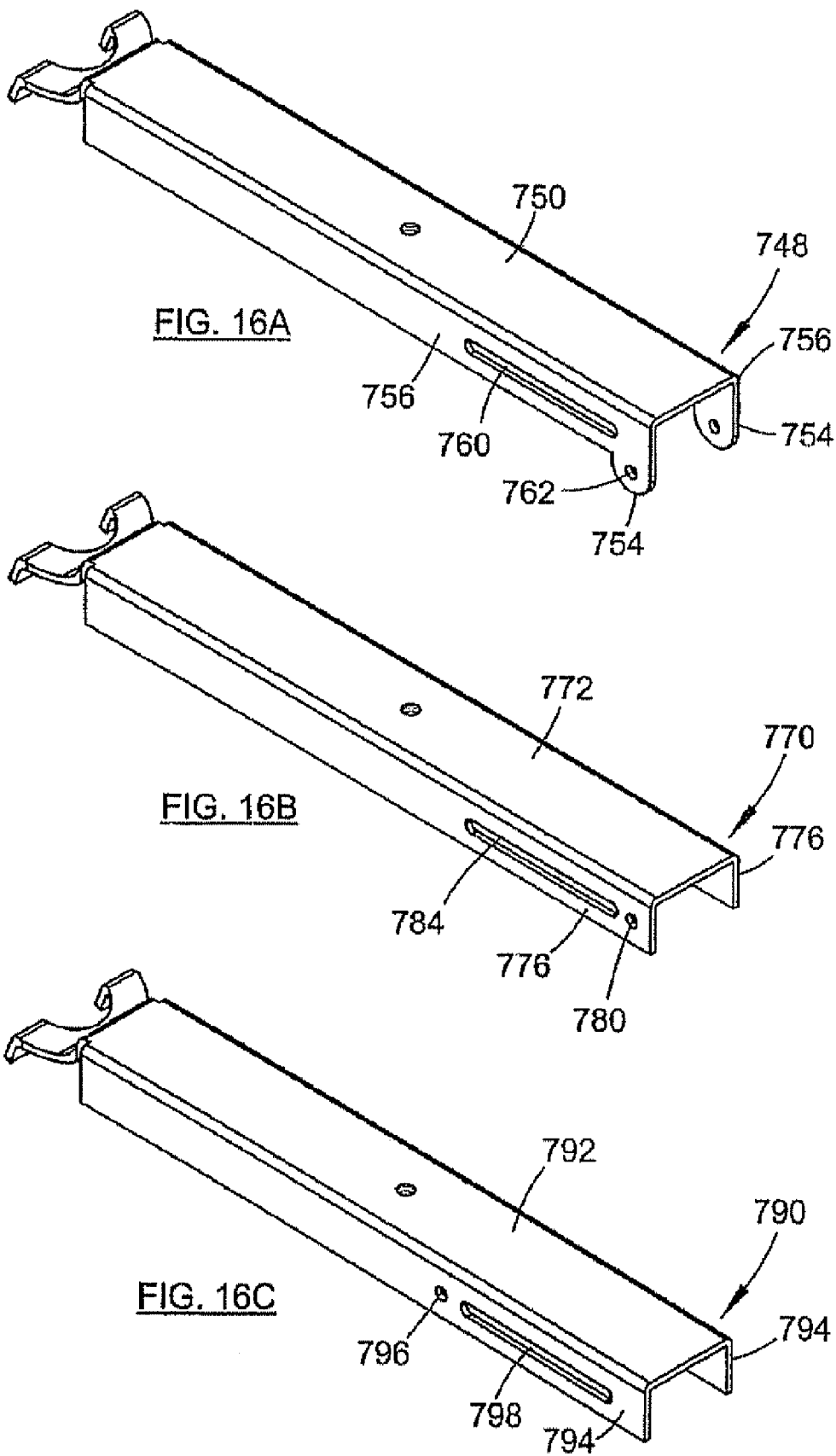

ATTACHMENT FACILITATING DEVICE FOR A BICYCLE

CROSS-REFERENCE TO RELATED APPLICATIONS

This application is a divisional of U.S. application Ser. No. 11/148,498, filed on Jun. 9, 2005, which claims priority from Canadian Patent Application No. 2,471,149 to Jefferson, entitled "Attachment Facilitating Device for a Bicycle".

FIELD OF THE INVENTION

The present invention relates to an attachment facilitating device for a bicycle and, in particular, to a device that facilitates the attachment of various types of carriers to a bicycle.

BACKGROUND OF THE INVENTION

The prior art includes various carriers for mounting between the saddle and the handlebars of a bicycle. If the carrier is a child carrier, this location has the advantages that the child can have a good view forwardly of the bicycle and is given a sense of security by being located between the arms of the rider, while the rider can observe the child.

Besides child carriers, it is known to attach other types of carriers to a bicycle. For example, pet carriers such as those of the type disclosed in U.S. Pat. No. 6,179,183 of Kloster can be attached to a bicycle. The pet carrier disclosed in Kloster is mountable on a top tube of a bicycle. In addition, this carrier can also be mounted on a female-style bicycle. For comfort purposes, the sidewalls of the carrier disclosed in Kloster have a plurality of air ventilation openings.

A support beam, such as those of the type that have the effect of converting a female-style bicycle into a male-style bicycle, can be used to facilitate mounting a carrier between the saddle and the handlebars of a bicycle when, for example, the bicycle lacks a top tube; however known "conversion" beams are inadequate for certain applications. For example, shorter or plumper individuals sometimes prefer the use of a female-style frame with a large space in front of the saddle. The beam design of the prior art effectively removes this space when mounted to the bicycle. As well, certain modern frame designs with a radically sloping top tube sloping upwardly aid forwardly, with a minimal seat tube can mace it difficult to satisfactorily mount a carrier in a horizontal disposition.

SUMMARY OF THE INVENTION

The term "bicycle" refers to a conventional upright adult bicycle and does not include a recumbent bicycle nor the like.

The term "clamp" as used herein means two or more cooperating elements for holding at least two things firmly together (unless a different meaning is evident from the context within which the term is used).

According to one example of the invention is an elongate support for a bicycle-mounted carrier that mounts between the saddle and the handlebars of a bicycle. The support includes first and second ends. A first clamp is associated with the first end for gripping a tubular member of the bicycle adjacent to the handlebars. A second clamp is associated with the second end for gripping a tubular member of the bicycle rearwardly of the first clamp. First and second elongate arms are slideably engageable with each other. The first and second arms each have a proximal end region opposite their respective distal end regions associated with the clamps. The first arm is for supporting the carrier and is fastenable thereto. The second arm includes a linear region extending from the distal end of the second arm towards the proximal end of the second arm. An angled region is adjacent the linear region. At least two fasteners enable fastening of the first and second arms together in either of at least two orientation-differing relationships. In one of the two relationships, angling out from the lineal region is in one direction. In the other of the relationships, angling out from the linear region is in a different direction.

According to another example of the invention is an elongate support for a bicycle-mounted carrier that mounts between the saddle and the handlebars of a bicycle. The support includes first and second ends. A first clamp is associated with the first end for gripping a tubular member of the bicycle adjacent to the handlebars. A second clamp is associated with the second end for gripping a tubular member of the bicycle rearwardly of the first clamp. The support also includes an elongate member for supporting the carrier and fastenable thereto. The member includes opposed sidewalls, a web spanning the sidewalls, an interior space between the sidewalls, and a joining end region opposite a clamp end region associated with the first clamp. A pair of bars each has a linear region and an angled region. Each of the bars is for fastening to one of the sidewalls. The linear region is associated with the second clamp. The angled region is adjacent the linear region. At least two fasteners enable the fastening to the sidewalls in either of at least two orientation-differing relationships. In one of the two relationships, angling out from the linear region is in one direction. In the other of the relationships, angling out from the linear region is in a different direction.

According to another example of the invention is a pet carrier for carrying a pet. The pet carrier is mountable on either one of a top tube of a bicycle, a support beam. The carrier includes a housing defining an interior space within which the pet can be placed. The housing includes a front side portion, a back side portion, a base configured for connection to the bicycle and an open top (or a removable top cover at a top of the housing). A net-like restraint is attachable to the housing for pressing against a back side of the pet when placed in the carrier. The net is for restraining movement of the pet towards the back side portions. A chin rest is located substantially at the top along the front side portion.

It may be convenient if the carrier housing includes at least one compartment for storing items.

It may also be convenient if the at least one compartment is sized to store a water bottle.

It may also be convenient, where the carrier housing includes a removable top cover, for the cover to be grid-like for facilitating ventilation.

Other aspects and features of the present invention will be apparent to those of ordinary skill in the art from a review of the following detailed description when considered in conjunction with the drawings.

BRIEF DESCRIPTION OF THE DRAWINGS

Reference will now be made by way of example, to the accompanying drawings which show example embodiments of the present invention, and in which:

FIG. 1 is a perspective view of a support constructed in accordance with a first embodiment of the present invention;

FIG. 2 is a side view of the support of FIG. 1;

FIG. 3 is a side view similar to that of FIG. 2, but with the support's rear arm in an inverted position;

FIG. 16A is a perspective view of an alternative exemplary front arm for a support constructed in accordance with an example of the invention;

FIG. 16B is a perspective view of another alternative exemplary front arm for a support constructed in accordance with an example of the invention; and FIG. 16C is a perspective view of yet another alternative exemplary front arm for a support constructed in accordance with an example of the invention.

Similar reference numerals may have been used in different Figures to denote similar parts in the illustrated apparatuses.

DETAILED DESCRIPTION OF THE INVENTION

Figure 4:
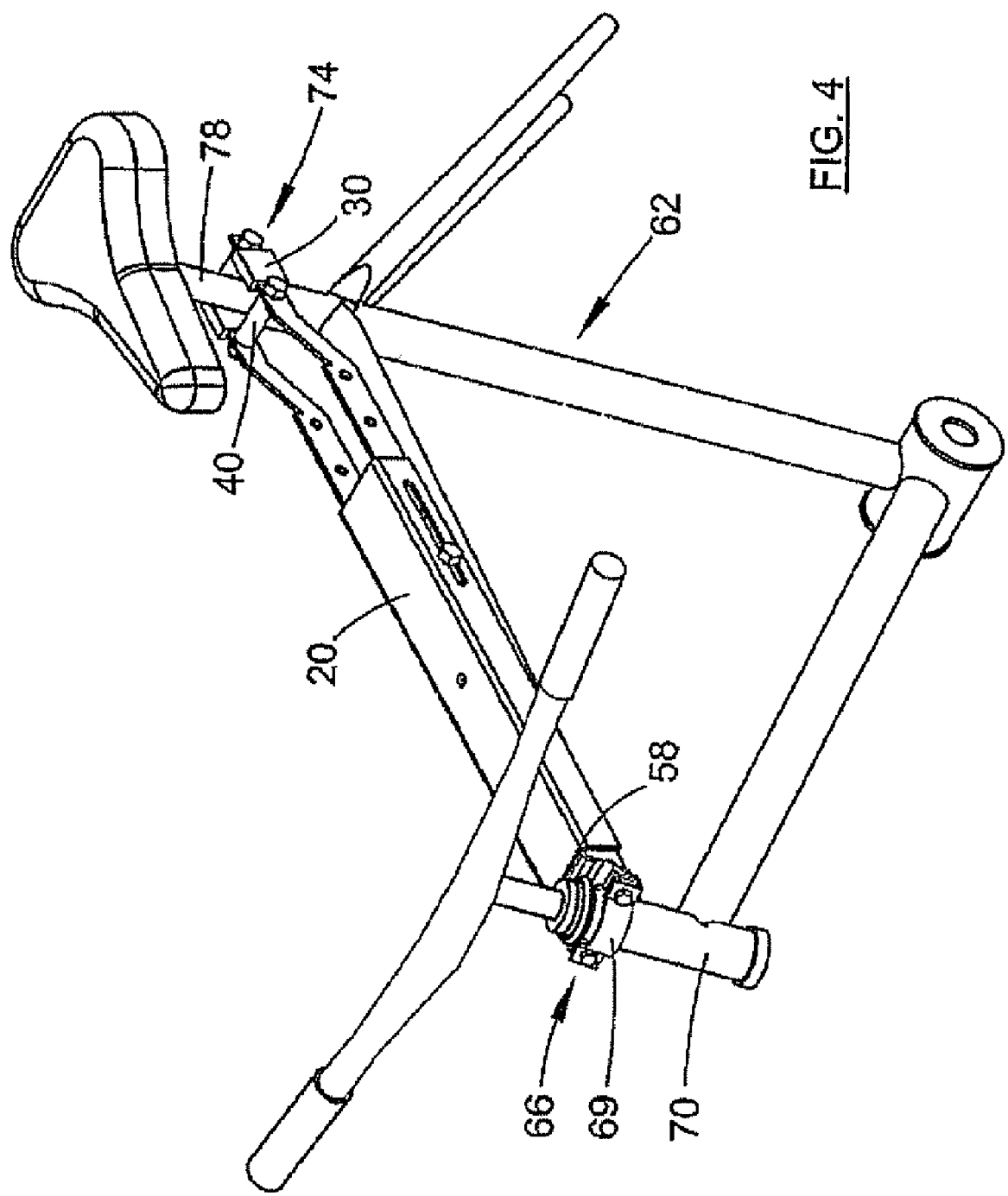
FIG. 4 is a perspective view of the support of FIG. 1 attached to a bicycle (parts of the bicycle being omitted for clarity)

FIG. 1 illustrates an elongate support according to an example embodiment of the present invention. The support comprises a rigid beam 18 that has a front or first end 58 and an opposed rear or second end 32. The rigid beam 18 of the support includes front and rear or first and second alms 20 and 22 which are slideably engageable with each other.

The arms 20 and 22 engage each other in a manner such that they may telescope to adjust the overall length of the beam 18. Further, as will be described below, the rear arm 22 may be put into any one of multiple different orientation relationships with the front arm 20 in order to change the relative position of the clamp at the rear arm's distal end. In FIG. 1, the distal end of the rear arm 22 is the end 32.

Front arm 20 comprises an elongate channel-shaped member having all inverted U-shaped cross-section, composed of sidewalls 1 and a web 2 spanning the sidewalls 1. There is an interior space between the sidewalls 1 (i.e. the space of the channel), and the proximal end of the arm 22 (end opposite the distal end) is slideably engaged with the interior surface of the arm 20. The rear arm 22 comprises two substantially parallel spaced apart bars 26 and 28, which in the illustrated embodiment are generally strip-like in shape, with each bar being fastened to a corresponding inside surface of a sidewall 1 of the front arm 20.

Referring to FIG. 2, regions of the rear arm 22 include a linear region 31 and an angled region 33. It will be seen that a wide range of configurations are possible for the rear arm. For example, the rear arm could have only one bar instead of two bars; however the illustrated rear arm is lighter than many alternative arms made of the same metal and a one bar arm, depending on the type of bicycle used, may not permit as many different front arm-rear arm orientation relationships. Also, even though the rear arm could be a single bar, it will be understood that a single strip-like bar (like the illustrated bar 26 or 28) will not be sufficient.

Both front and rear arms include front clamp or clamp assembly 66 and rear clamp or clamp assembly 74 respectively at their distal (free) ends (the distal end of the front arm 20 is end 58) for releasably fastening the beam 18 to a bicycle. The clamp 74 is for releasable attachment to a seat tube or seat post of a bicycle frame. Also, a first region of the clamp 74 is releasably attached to the region 31 of the bar 26. A second opposed region of the clamp 74 is releasably attached to the region 31 of the bar 28. The front clamp 66 joins the front arm 20 to the bicycle at a position close to the handlebars, such as the head tube of the bicycle frame.

With respect to the support illustrated in FIGS. 1–3, the lengths of the front and rear arms 20 and 22 are roughly equal. It will be appreciated by one skilled in the art that neither the absolute lengths nor the length ratio (front arm to rear arm) are essential; any combination of arm lengths will suffice provided the resulting beam will fit a bicycle conveniently. Also it will be understood that the arms 20 and 22 can be made from a suitable rigid material, including a metal, such as steel or aluminum. Also, some types of plastic may be suitable.

The front and rear arms are joined together by aligned slots and holes within the respective arms. Thus, there are a plurality of spaced apart holes 42 along the bars 26 and 28. In one particular version of the rear arm 22, there are seven of the holes 42 per arm, and the holes are evenly spaced apart from each other. The holes 42 may be aligned with slots 46 within the sidewalls of the front arm 20. These holes 42 are designed to receive fasteners, to fix the position of the rear arm 22 with respect to the front arm 20 once the support has been telescoped to the desired position. Each bolt of the fastener is fitted through both an elongate slot 46 and one of the holes 42. In one embodiment, increased rigidity is achieved by using two spaced apart fasteners per side. Although only one of the elongate slots can be seen in the drawings, there are two opposed elongate slots 46 formed in the opposite sidewalls 1 of the front arm 20. The size of the slot 46 will vary depending upon such factors as the size of the holes 42 and the desired number of holes to be exposed through the slot. The holes 42 and the slot 46 should not be so large as to result in the loss of rigidity. Reversible fastener means is provided by the slots 46, the holes 42 and the associated fasteners. It will be appreciated by one skilled in the art that the fasteners could be detent mechanisms instead of nut and bolt combinations. Also, it will be understood that other types of reversible fastener means are contemplated, and that these need not include slots and/or holes.

Use of single fastener per side permits angular adjustment of arms (as will be subsequently described), while multiple fasteners are useful when a linear beam will suffice.

Referring to FIG. 1, the front arm 20 of the beam 18 includes a mounting means to attach a carrier. In FIG. 1, this is shown as a threaded vertical hole 50 in the web 2 of the front arm 20. The threaded hole 50 permits the fastening of a carrier, such as a child seat, saddle bag, small animal seat, item carrier, or other carrier having a mating threaded post or bolt. The attachment of such devices is described in published U.S. patent application no. 2004/0061361 (hereinafter "the previously mentioned U.S. patent application") the entire contents of which are incorporated herein by reference. Attachment is not limited to being carried out as described. For instance, having at least a single hole is not necessarily required, as attachment of the carrier to the support could be carried out by alternative attachment means, such as by possibly incorporating the female mating part into the carrier instead of into the beam 18.

Two different front arm-rear arm orientation relationships are shown in FIGS. 2 and 3. In particular, FIG. 2 illustrates the arms 20 and 22 fastened together in a first position where the angled region 33 angles upwardly. FIG. 3 illustrates the arms 20 and 22 fastened together in a second position where the angled region 33 angles downwardly. In one of the illustrated orientation relationships angling out from the linear region is in one direction, and in the other illustrated orientation relationship angling out from the linear region is in another direction.

Each of the bars 26 and 28 have a linear region 31 and an angled region 33. The linear region 31 is associated with the rear clamp 74. The angled region 33 is adjacent the linear region 31. As shown, the angled regions of the bars displace the clamp either above or below the mid-plane of the beam.

Changing the configuration of the support from that of FIG. 2 to that of FIG. 3 (or vice versa) can be accomplished by inverting the rear arm 22 (i.e. flipping it). Which configuration should be used for a particular bicycle depends on which configuration will best permit the front arm 20 to be substantially horizontal when the support is attached to the bicycle.

In order to assist in understanding the illustrated support, one can visualize an axis parallel to the length of the front arm 20. This axis extends through the front end 58 and rear end 59 of the front arm 20. One can then visualize another axis extending through the front end 58 and the end 32. Flipping the rear arm 22 provides a means for varying the angle between these two axes. When the support is attached to a bicycle, the configuration of FIG. 2 is one in which the end 32 will be above the front end 58, and the configuration of FIG. 3 is one in which the end 32 will be below the front end 58. Because the rear clamp or clamp assembly 74 is on the end 32, flipping of the rear arm 22 is a way of permitting height adjustment of the rear clamp assembly 74 without impact upon the position of the surface provided for carrier attachment. When the rear clamp assembly 74 is at a lower height, so too might the saddle be positionable to a lower height.

FIG. 4 illustrates the support of FIG. 1 attached to a bicycle frame, a part of which is indicated by reference numeral 62. In this Figure, the front arm 20 is substantially horizontal (when the bicycle is resting on a horizontal surface).

The front clamp assembly 66 attaches the support to the bicycle. More specifically, the front clamp assembly 66 grips a tubular member of the bicycle in the handlebar region, such as the head tube 70 (or handlebar stem, although this would be less suitable and unlikely in light of the rotation of the stem). The front clamp assembly 66 is a conventional operable clamp for gripping a tube such as that described in the previously mentioned U.S. patent application. Preferably, the clamp 66 is generally horizontally oriented to grip a generally vertical tube. However, one skilled in the art will appreciate that when suitably modified the clamp 66 may grip any part of the front region of the bicycle, such as the forward region of the top or down tubes. The clamp 66 includes two openable and opposed regions 67 and 69 which are best seen in FIG. 1.

The rear clamp assembly 74 grips seat post 78, and is of a conventional openable arrangement such as that described in the previously mentioned U.S. patent application. The rear clamp assembly 74 includes bridge assemblies (which each include a rigid spacer 37 and a compressible sleeve 40) and resilient sleeves 30. The bridge assemblies maintain the bars 26, 28 in parallel spaced apart relationship while also compressing in length when tightened to form a mount to attach the device to a seat post or seat tube. Centrally in each of the bridge assemblies is a rigid spacer 37, which could comprise a bolt. Providing a rigid spacer is clearly not essential to the invention. It will be understood that the bridge assemblies could easily be replaced by something else which might include, for example, a foam piece.

The pair of resilient sleeves 30 which are of hollow rectangular cross-section fit onto the bars 26 and 28 at the end 32 between the bridge assemblies. The illustrated sleeves 30 permit compensation for different seat post sizes and are further described in the previously mentioned U.S. patent application. The sleeves provide both cushioning and grip when engaged with the bicycle frame or post. While the sleeves 30 are useful, there are suitable alternative clamps that do not employ sleeves. Also in certain circumstances the compressible sleeves 40 might be able to maintain the rigidity of the mounting.

Figure 5:
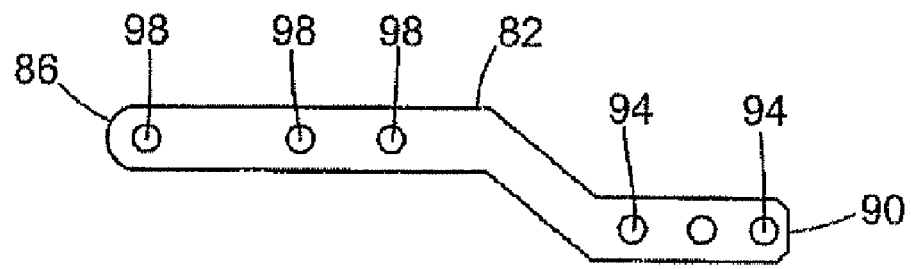
FIG. 5 is a side view of a bar used in a support constructed in accordance with a second embodiment of the present invention.
Figure 6:
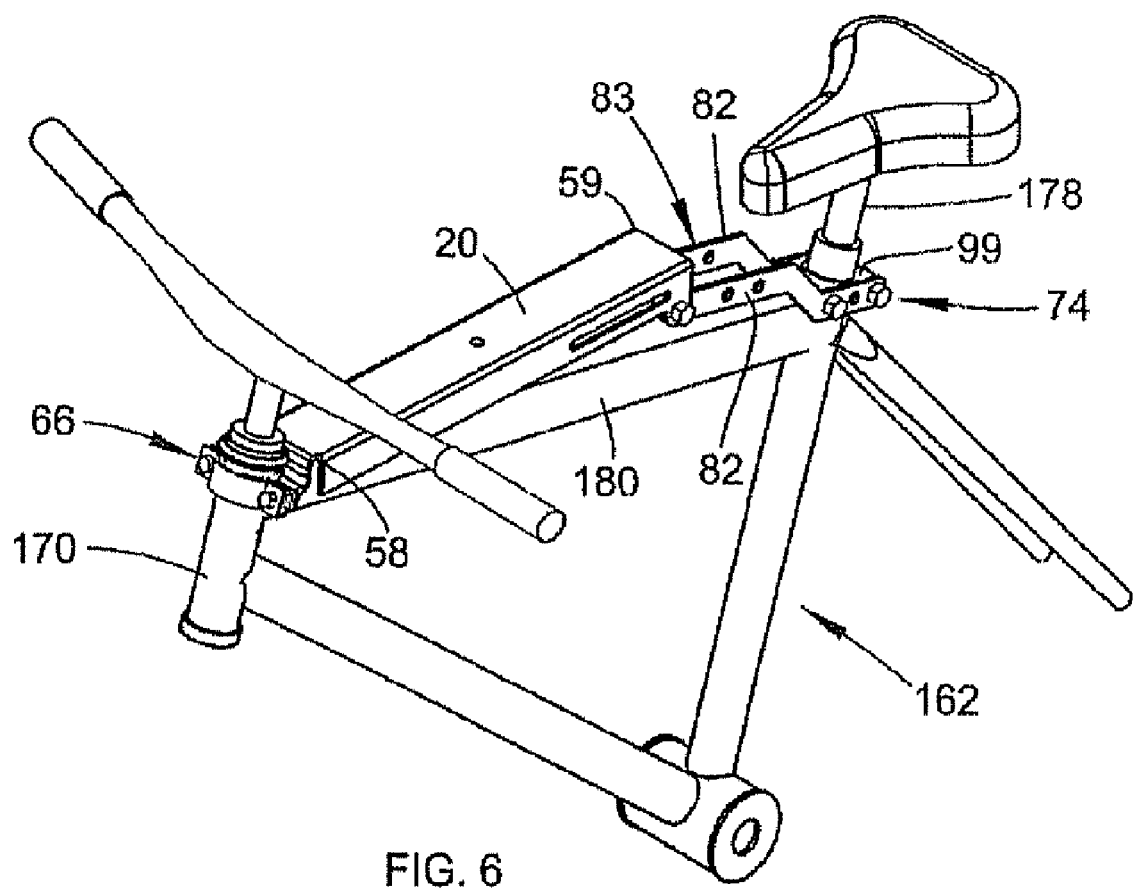
FIG. 6 is a perspective view of a support constructed in accordance with a second embodiment of the present invention, and the support being attached to a bicycle (parts of the bicycle being omitted for clarity)

FIGS. 5 and 6 illustrate a configuration of bars 82 in an alternative example embodiment, wherein the beam 18 is composed of front and rear arms 20, 83 which are pivotally joined together at their proximal ends. As in the first embodiment, the distal ends (front and rear) include clamps to grip the bicycle at or near the handlebar and seat regions respectively. The pivoting arrangement permits the carrier to be used with a variety of bicycle sizes and types, such as small-framed bicycles, female frames, and those with a radically sloping top tube. The rear arm 83 may be rotated downwardly by a variable amount depending on the frame size/type and needs of the rider. Once clamped to the bicycle, further pivoting movement of the arm is prevented by the front and rear ends of the beam being firmly fixed in position on the bicycle. The strip-shaped bar 82 has a front end 86 and a rear end 90. The front end 86 is rounded to facilitate pivoting within the front arm 20. The illustrated strip-shaped bar 82 has a length slightly more than half the length of the strip-shaped bars 26 and 28 illustrated in FIG. 1. Holes 94 are for attachment of a pair of the bridge assemblies, one of which can also extend through a hole in seat post clamp 99 as illustrated. Holes 98 are for essentially the same purpose as the holes 42. If the strip-shaped bars are pivoted, only one of the holes 98 per arm would be used. The holes 94 and 98 are elements in fastening means, and it is known to achieve fastening without the use of holes.

FIG. 6 illustrates the support constructed with the shorter strip-shaped bars 82. This version of the support is shown attached to a bicycle frame, a part of which is indicated by reference numeral 162. As in FIG. 4, the front clamp assembly 66 grips a head tube 170 forming part of the bicycle frame. The rear clamp 74 clamps at the location of the seat post clamp 99 for seat post 178. Differences between the rear clamp shown in FIG. 6 and the rear clamp shown in FIGS. 1–4 include: 1) one of the bridge assemblies (with the sleeve 40 absent) extends through a hole in the seat post clamp 99; and 2) the sleeves 30 are absent.

For the particular bicycle shown in FIG. 6, top tube 180 is sloped (quite significantly) downwardly and rearwardly. This type of bicycle frame is typically provided for use by shorter riders. An example of a category of bicycles that can have radically sloping top tubes is the 24"–26" (wheel size) category (the bicycles in this category typically have a shorter distance between the saddle and the handlebars).

For those bicycle frames such as the exemplary frame depicted in FIG. 6, it may be undesirable to have the front arm 20 parallel with the top tube 180. For example, when a carrier is attached to the top tube 180, the carrier may end up being unsatisfactorily attached because the carrier may not be designed to be angled. A consequence of a non-level carrier could be the pushing of the carrier into the bicycle's steering fork mad/or shock absorbers.

It is therefore typically desirable to have the front arm 20 (to which the carrier would be attached) substantially horizontal. Pivoting the strip-shaped bars 82 downwardly permits the rear clamp 74 to grip the seat tube or seat post near the junction of the top tube for greater strength and less interference with the rider. It also permits use of the device with a shock-absorbing seat post. Also, it could allow a short bicycle rider to lower his or her saddle all, or nearly all the way down.

Before the front clamp assembly 66 and the rear clamp assembly 74 are clamped to the head tube 170 and the seat post 178 respectively, the rear arm of the support can pivot away or towards the axis through the ends 58 and 59. After both the front clamp assembly 66 and the rear clamp assembly 74 are in gripping engagement with the head tube 170 and the seat post 178 respectively, the rear arm of the support cannot substantially pivot away or towards the axis through the ends 58 and 59.

The support illustrated in FIG. 6 may also be particularly desirable if interference with any cables running along the top tube 180 is a concern. As can be seen in FIG. 6, the front arm 20 and the strip-shaped bars 82 are significantly distanced from the top tube 180 (except at the top tube ends). Also the underside channel of the front arm 20 and the space between the bars 82 facilitate avoidance of any interferences.

Figure 7:
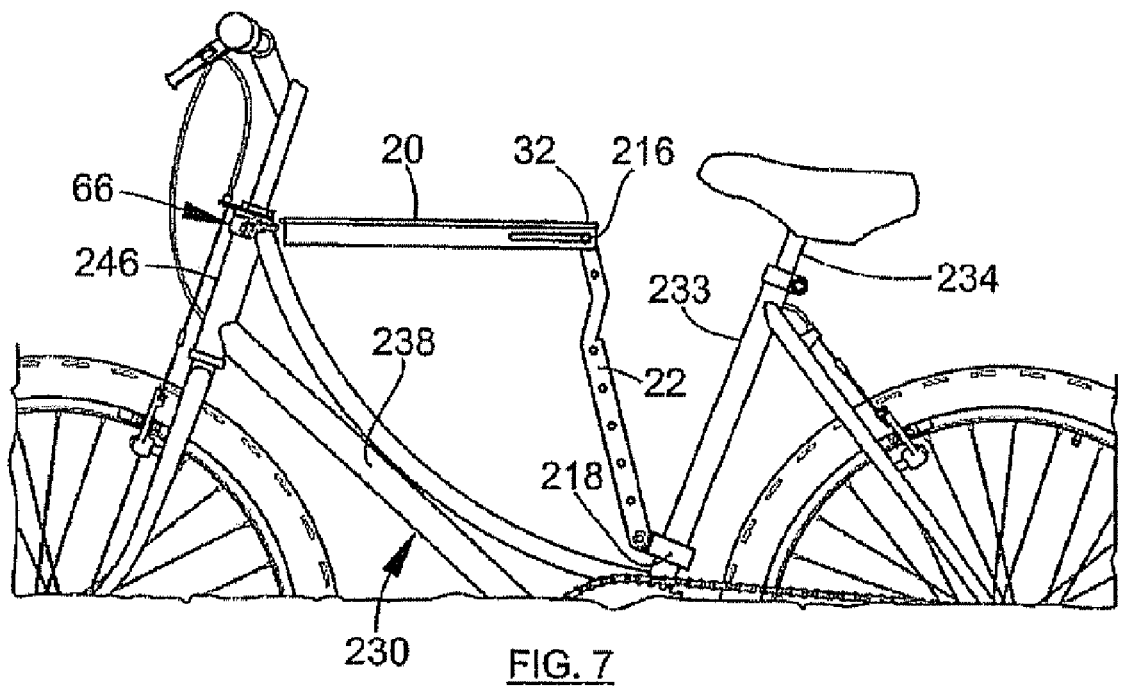
FIG. 7 is a side view of a support constructed in accordance with a third embodiment of the present invention, and the support being attached to a bicycle.
Figure 8:
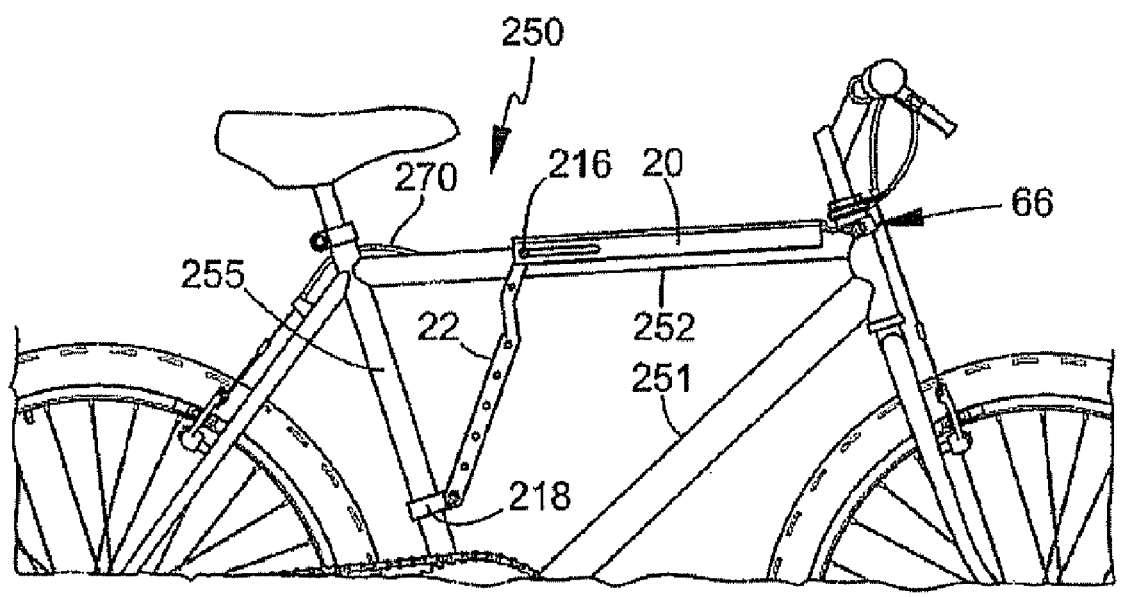
FIG. 8 is another side view of the support of FIG. 7 attached to a different bicycle.
Figure 9:
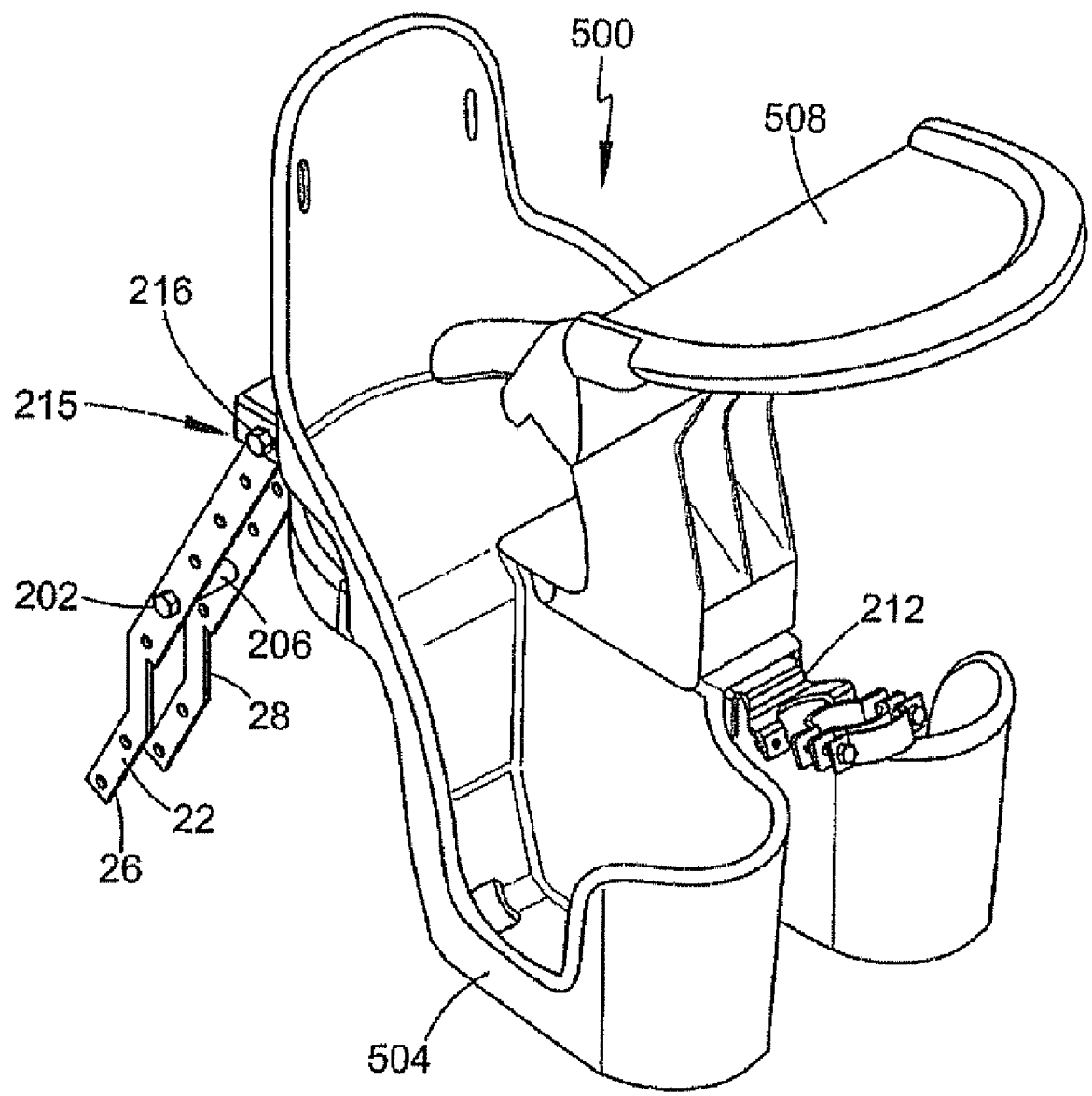
FIG. 9 is a perspective view of an infant seat assembly mounted on the support of FIG. 7.

The support illustrated in FIGS. 7–9 is constructed using front arm 20 and a rear arm 22 of the type shown in FIG. 1. The rear arm 22 has been reversed front to back such that instead of the gripping means (clamping device 218) being on the end 32, the gripping means is instead on the other end of the rear arm 22, which previously was the proximate end.

Means for keeping the strip-shaped bars 26 and 28 spaced apart is provided. In particular, nut and bolt assembly 202 extends through compressible cylindrical sleeve 206 (the sleeve 206 can be the same sleeve as the sleeve 40 illustrated in FIG. 1). The arrangement facilitates keeping the bars apart, but also together for strength. It will be appreciated that the means for keeping the strip-shaped bars 26 and 28 spaced apart is not necessarily needed for all applications. For example, the strip-shaped arms are also spaced apart by, for example, the seat tube. There are also other possible means for keeping the strip-shaped bars 26 and 28 spaced apart, like a resilient piece of foam, for example. It will however be appreciated that the illustrated arrangement provides a rigid spacer. It may also assist in preventing deformation of the bars 26 and 28.

The rear arm 22 can pivot with respect to the front arm 20, via a pivot or pivot joint 215 comprising a pair of fasteners such as nut and bolt combinations 216. In the illustrated embodiment, the front and rear arms are joined at the pivot joint 215. Also, the fasteners 216 can be of the type that, when sufficiently tightened, prevent further pivotal movement. It will be appreciated by one skilled in the art that the illustrated pivot joint 215 is only one possible means to pivotally attach the rear arm 22 to the front arm 20 and permit pivotal movement thereof.

The rear arm 22 also has a clamp 218 at its distal end. The clamp 218 permits attachment of the distal end to the frame of a bicycle. The clamping device can be any type of conventional openable clamp having opposing members for gripping a tube, and the illustrated clamp 218 is similar to a clamp sold under the trademark Krypto. This particular clamp can be pivoted with respect to the rear arm 22 in order to better facilitate attachment to more than one possible tubular member.

FIG. 7 illustrates the support attached to a bicycle frame 230 that does not have a top tube. In this Figure, clamping device 218 is in gripping engagement with a seat tube 233 (visibly below seat post 234). The clamping arrangement could be modified so that the clamping device 218 is instead in gripping engagement with down tube 238. Thus, the clamping device 218 can be in gripping engagement with different parts of the frame 230 (e g, the seat post 234, the down tube 238).

In FIG. 8 the support is attached to a different bicycle frame 250 which includes a top tube 252. The clamping device 218 is in gripping engagement with seat tube 255 at a point on the tube 255 below the top tube 252. Gripping engagement below instead of above the top tube 252 prevents possible interference with the cable 270.

Changing the tubular member clamped by the clamping device 218 is again possible. For the bicycle and support illustrated in FIG. 8, one possible way in which this could be carried out would be by first opening up the opposed regions of the clamping device 218, then rotating both the rear arm and the clamping device 218, and finally closing the opposed regions of the clamping device 218 so as to clamp down tube 251 of the bicycle frame 250.

FIG. 9 illustrates an infant carrier which comprises a seat and headrest assembly 500 mounted on the support. The seat and headrest assembly 500 is disclosed in the previously mentioned U.S. patent application. The seat and headrest assembly 500 includes an infant seat or child's seat attachment 504 and a headrest attachment 508. The headrest attachment 508 is mounted on the child's seat attachment 504 which, in turn, is mounted on the support in the location of an attachment point that can be relatively close to front end 212 of the front arm. The previously mentioned U.S. application describes how the seat and headrest assembly 500 can be attached to the illustrated carrier.

Whereas a carrier in the form of a seat and headrest assembly for an infant is illustrated in FIG. 9, a carrier in the form of a pet carrier 550 is illustrated in FIGS. 10–15. The carrier 550, which can be made from a variety of different materials including plastic, includes a housing 554 that defines an interior space within which a pet, such as a cat or a small dog, can be placed. Cross-sectionally speaking, the illustrated housing 554 is somewhat oval. A convex (as opposed to flat) front side portion is preferred for at least some carriers to better prevent steering difficulties for the bicycle rider.

The illustrated carrier tapers towards the bottom of the carrier 550. There is not an important functional reason for this, but this characteristic might permit reduced injection molding costs. In one example embodiment, the backside portion of the pet carrier tapers more acutely towards the rear as compared to the illustrated backside portion 558.

Figure 15:
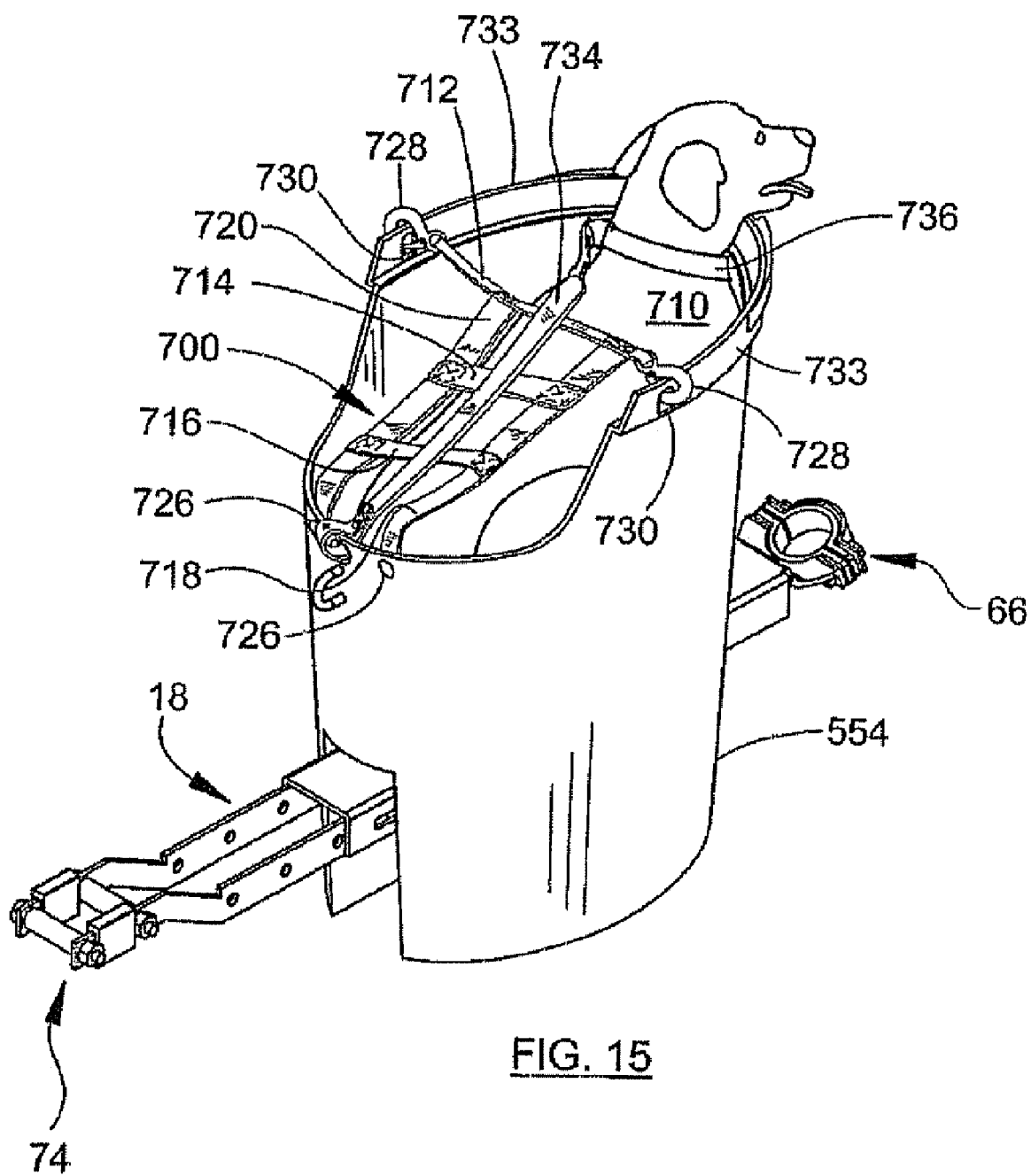
FIG. 15 is a perspective view illustrating a dog within the pet carrier of FIG. 10.

In the lower region of the housing 554, an elongate channel 566 extends from the backside portion 558 to the front side portion 562, permitting the carrier 550 to straddle an elongate member or beam (such as the beam 18 illustrated in FIG. 15). A suitable aperture or slot can be provided in carrier floor 620 (located at the top of the channel 566) to receive a fastener for securing the carrier 550 to the straddled member or beam. In this manner, the base of the carrier 550 is configured for connection to a bicycle.

Figure 10:
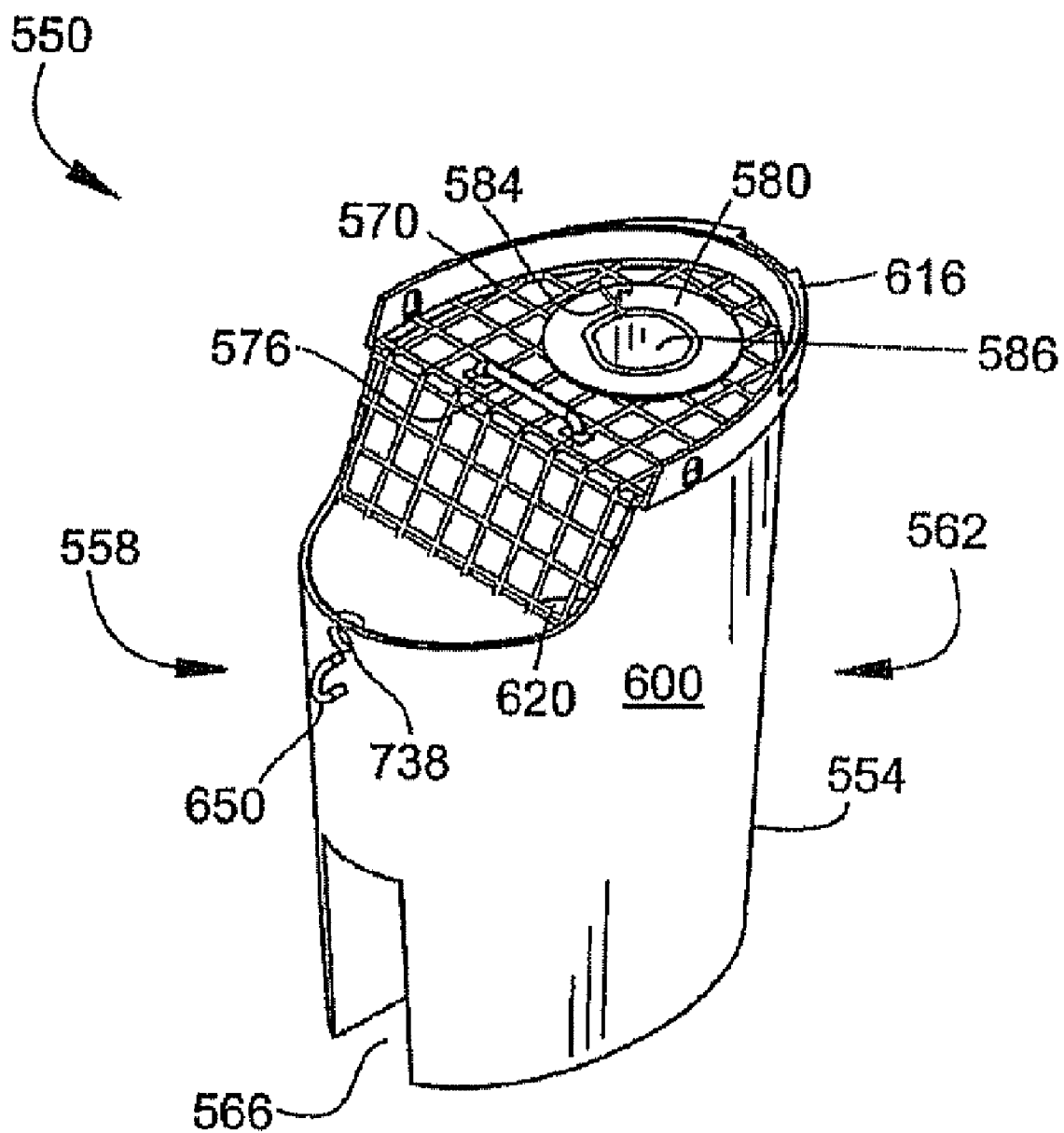
FIG. 10 is a perspective view of a pet carrier constructed in accordance with an embodiment of the present invention.

In FIG. 10, the carrier 550 is illustrated with a top cover (or lid) 570 in a closed position. For a pet to be placed within the carrier 550, the lid 570 needs to be moved to at least a semi-open position, but also it could be entirely removed from the top of the housing 554. In one embodiment, the lid 570 is associated with a hinge mechanism (not illustrated) located in the back side portion 558. The hinge mechanism can be of the known type that when the lid 570 is lifted upwardly to a certain angle by pulling on handle 576 or other lid portion, the lid 570 can simply be separated from the carrier 550.

It will be understood that it may be desirable to have the lid 570 completely separated if a large enough dog is being placed in the carrier 550. On the other hand, in the case where a cat (or a small puppy) is being placed in the carrier 550, the lid 570 can be simply lifted up but not removed before the pet is placed in the carrier 550. In conjunction with this second scenario, a fabric patch 580 is provided to partially restrict a hole in the lid 570 through which the head of the pet can extend. Ties 584 are used to expand or restrict opening 586 through which the pet's head can extend.

If a pet is placed inside the carrier 550 and the lid 570 is returned to a closed position, it will be desirable to prevent the lid 570 from becoming dislodged from the closed position. Various known locking mechanisms can be employed to prevent undesired dislodging from the closed position. In one example embodiment, a latch-type mechanism (possibly one that is engaged by rotation action) is employed. In another example embodiment, the periphery of the carrier's lid can fixedly engage an adjacent edge of the carrier 550 in a manner somewhat similar to Tupperware® containers.

Depending upon the pet placed in the carrier 550, padding could be added at locations such as chin rest 616 and the carrier floor upon which the pet is placed. It will be appreciated that certain types of padding are less likely to be chewed by the pet. Also, significant interference with the means for providing air flow within the housing 554 may be undesirable.

Side walls 600 and front side 604 of the carrier 550 include a plurality of ventilation holes 608 for comfort purposes. In FIGS. 10 and 13–15, the ventilation holes 608 have been omitted for the purpose of clarity, except in FIG. 14 where two are shown at the end of a projection line. In the illustrated embodiment, the holes 608 are circular; however it will be understood that ventilation can be achieved equally well with holes of other shapes and sizes. It will be understood that because the carrier 550 can be mounted between the saddle and the handlebars of a bicycle, the carrier 550 may permit better ventilation than those pet carriers intended to be mounted behind the back of a bicycle rider, because this latter position has reduced air flow as compared to the former position.

The top cover 570 also facilitates ventilation. This is due to the fact that it is grid-like. It will be understood that the grid-like portion of the lid 570 need not be made of plastic. For example, the grid-like portion could consist of metal wiles.

Although the illustrated lid is flat in regions, various lids of different shapes are possible. For example, the lid could have regions that bulge out.

Located below the floor 620 of the carrier 550 are storage compartments 624 and 628. In the illustrated embodiment, the storage compartment 624 is sized to house a standard sized water bottle. The compartment 628 is designed to hold miscellaneous articles, and can be accessed through an opening in the associated side wall 600. The storage compartment 624 is accessed by opening compartment cover 633, which preferably swings up or pops out. The cover 633 can be held closed in a variety of known manners, such as by means of a catch.

Figure 14:
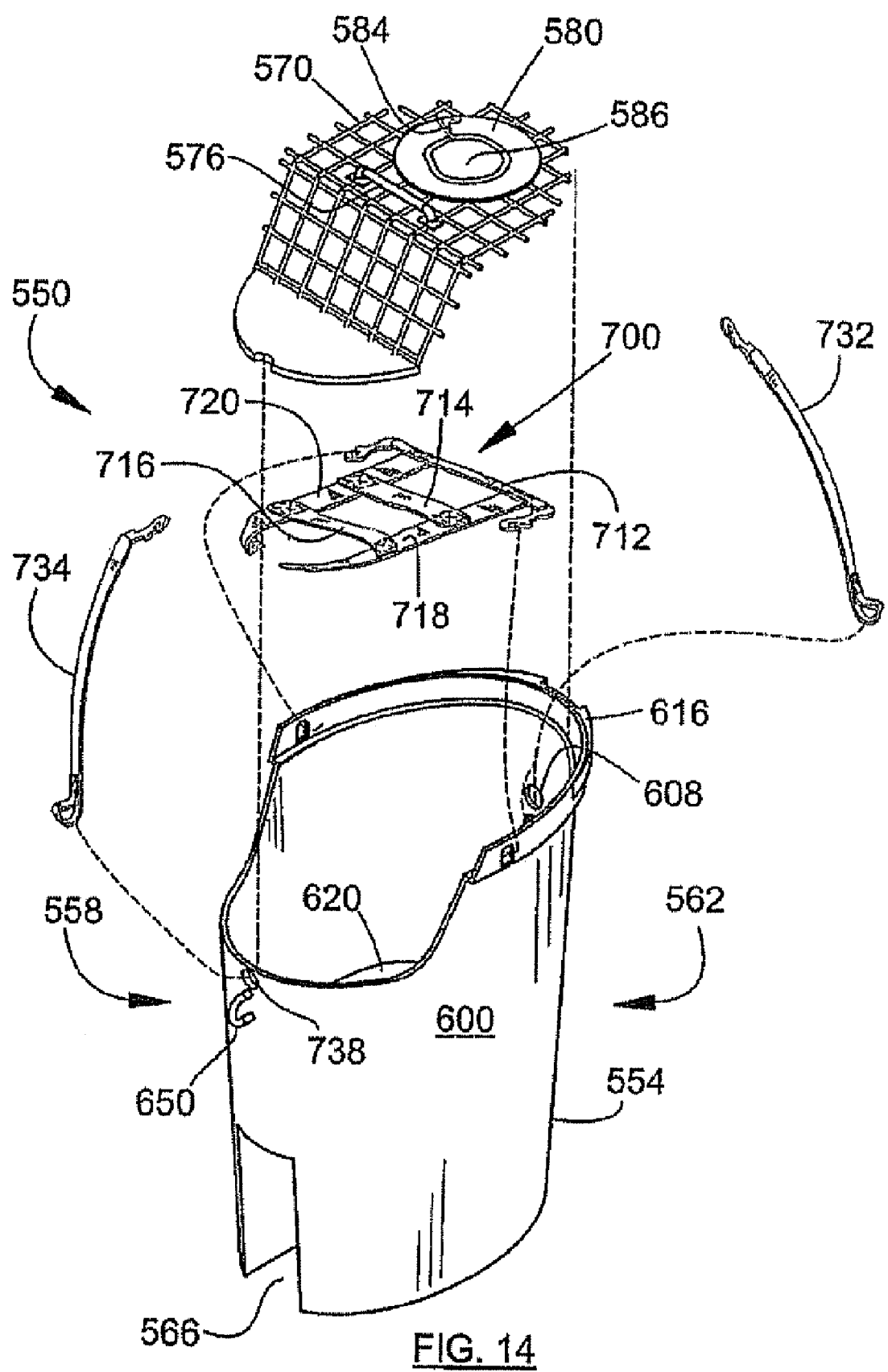
FIG. 14 is an exploded view illustrating the pet carrier of FIG. 10 and its internal components.

As shown in FIGS. 14 and 15, the carrier 550 includes a net-like restraint 700 that attaches to the housing 554. When pet 710 is within the carrier 550, the restraint 700 presses against a back side of the pet 710. In the illustrated embodiment, the restraint 700 includes three spaced-apart straps 712, 714, 716 extending in one direction, and two additional spaced-apart straps 718, 720 that extend crosswise the other straps. The five straps can be stitched together (as illustrated or in some other manner) so as to form a unitary piece. Rivot fasteners 726 (or alternatively other fasteners such as releasable fasteners) attach the straps 718 and 720 to the housing 554. Releasable fasteners 728 (e.g. clasp, Velcro™, etc.) attach the strap 712 to the side walls of the carrier. Apertures 730 are provided for connecting the fasteners 728 to the respective side edge 733. It will be understood that the straps 712–720 can be made of any suitable material (e.g. nylon, flexible plastic, etc.). The number of straps used, the size of individual straps and the strap arrangement will vary from carrier to carrier.

Either front-attached leash 732 or rear-attached leash 734 is connected to pet collar 736 to further secure the pet 710 within the carrier 550. One or more apertures 738 or the ventilation holes 608 can permit connection of clasp-opposite end of the leash 732 or 734 to the housing 554.

Figure 11:
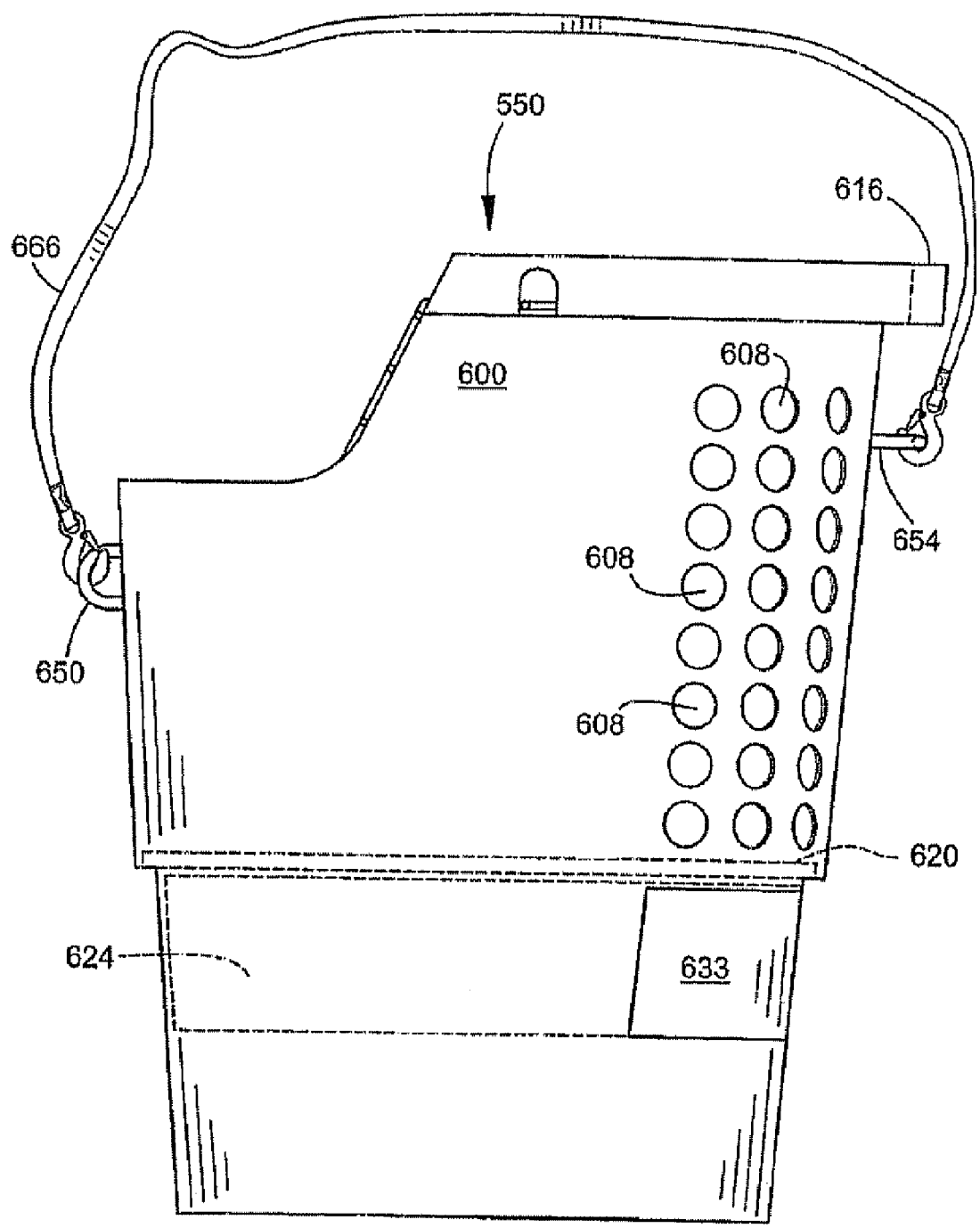
FIG. 11 is a left side elevational view of the pet carrier of FIG. 10.
Figure 12:
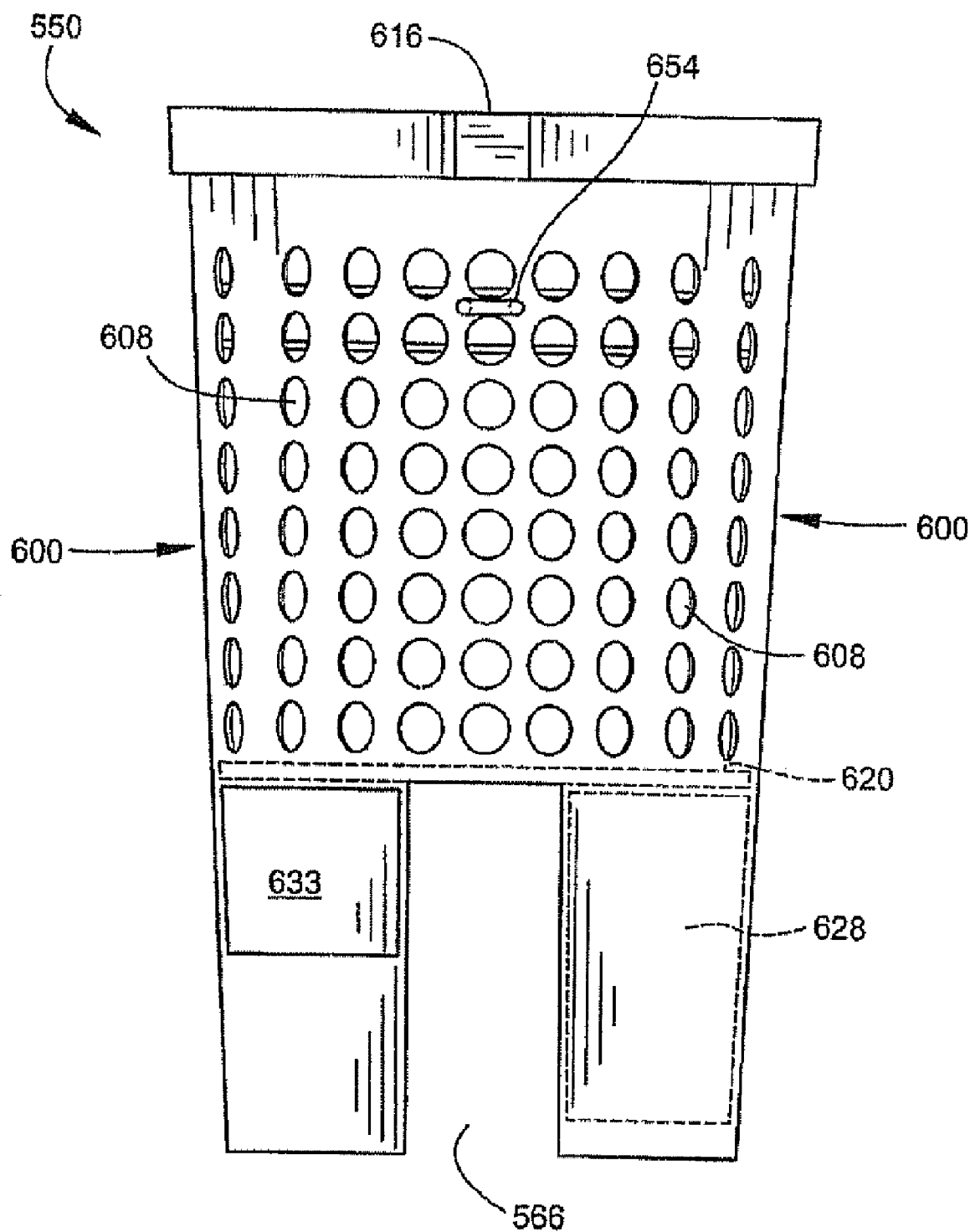
FIG. 12 is a front elevational view of the pet carrier of FIG. 10.
Figure 13:
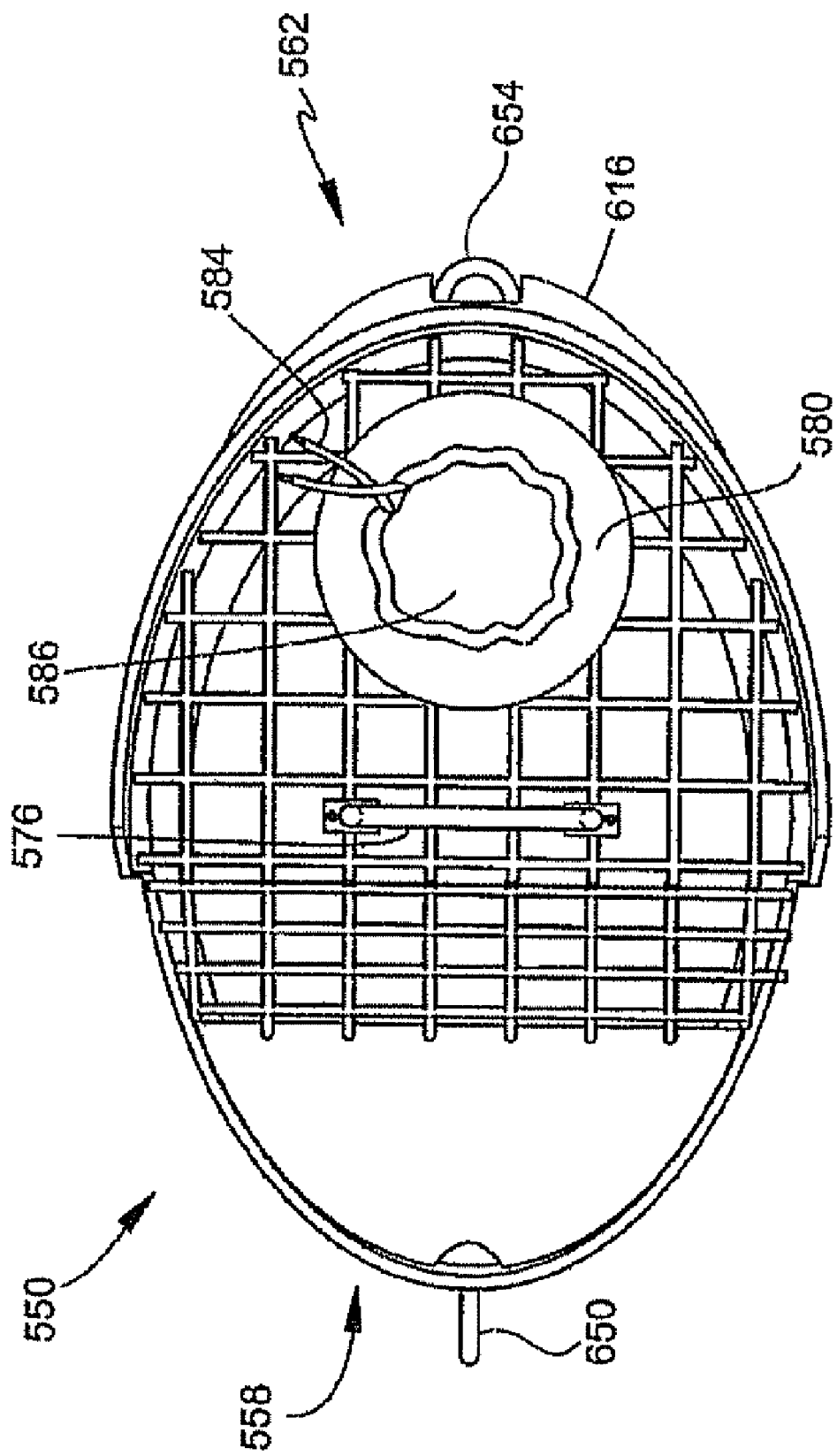
FIG. 13 is a top view of the pet carrier of FIG. 10.

When the carrier 550 is not attached to a bicycle, it may be useful for the carrier 550 to include means for facilitating a person to carry the carrier 550 around with him. Referring to FIG. 11, eyelets 650 and 654 are provided to permit attachment of a strap, such as shoulder strap 666, for carrier carrying purposes. Also, it might be desirable to be able to strap the pet carrier into a car seat. A belt clip could be provided in the upper section of one of the sidewalls 600, or at another location (such as just below eyelet 654), or belt clips could be provided at multiple locations. The shoulder portion of the seat belt would be received by the clip, and the belt portion of the seat belt would stretch around the pet carrier in the base region. Preferably there will not be ventilation holes in the carrier in the location where the clip is attached to the carrier.

Other seat belt attachment means are contemplated. For example, a pet carrier constructed in accordance with one example embodiment could include one or more suitable slots extending through the pet carrier housing from one of its side walls to the other in order to connect a car safety belt to the pet carrier.

FIGS. 16A–16C illustrate alternative rear ends (joining ends) for the front arm 20 (best shown in FIGS. 1–3). In FIG. 16A, end 748 of arm 750 includes a pair of projections 754 integral to the channel member. Each side wall 756 of the arm 750 defines a slot 760 that is relatively close to an aperture 762 defined in each of the projections 754. The apertures 762 are preferably used (i.e. receive nut and bolt assemblies) for front arm-rear arm configurations such as those illustrated in FIGS. 6–8. The slots 760 are preferably used (i.e. receive nut and bolt assemblies) for front arm-rear arm configurations such as the configuration illustrated in FIG. 4.

In FIG. 16B, end 770 of arm 772 does not include projections. Nevertheless, each sidewall 776 of the arm 772 defines both an aperture 780 and an adjacent slot 784. The slots 784 and the apertures 780 have the same purpose as the slots 760 and the apertures 762 respectively.

In FIG. 16C, end 790 of arm 792 also does not include projections. Each sidewall 794 of the arm 792 defines both an aperture 796 and an adjacent slot 798, but the positions are reversed as compared to the positions of the arm shown in FIG. 16B. The slots 798 and the apertures 796 have the same purpose as the slots 760 and the aperture 762 respectively.

Although the described embodiments of the support are designed to support loads of up to 50 lbs, loads well above 50 lbs are not intended. Because of likely bicycle instability, it would be usually unadvisable in any event to ride a bicycle with an additional load of say 200 lbs.

It will be understood that if the carrier attached to the support is too large, a person's ability to ride the bicycle could be affected. In an example embodiment, all dimensions of the carrier are less than 0.5 m.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A pet carrier assembly for mounting to a bicycle between the saddle and the handlebars of the bicycle, the carrier assembly comprising an elongate support and a pet carrier attachable to the support, the support including:
   i) first and second ends;
   ii) a first clamp associated with said first end for gripping a tubular member of said bicycle adjacent to said handlebars;
   iii) a second clamp associated with said second end for gripping a tubular member of said bicycle rearwardly of said first clamp;
   iv) an elongate member for supporting said pet carrier and fastenable thereto, said member including opposed sidewalls, a web spanning said sidewalls, an interior space between said sidewalls, and a joining end region opposite a clamp end region associated with said first clamp;
   v) a pair of bars each having a linear region and an angled region, each of said bars for fastening to one of said sidewalls, said linear region associated with said second clamp, said angled region adjacent said linear region; and
   vi) at least two fasteners enabling the fastening to the sidewalls in either of at least two orientation-differing relationships,
   wherein in one of said two relationships angling out from said linear region is in one direction, and in the other of said relationships angling out from said linear region is in a different direction.

2. A pet carrier assembly as claimed in claim 1, wherein said one of the two relationships may be selected if the bicycle is characterized by having a top end of its seat tube substantially below the handlebars, and the other of said relationships may be selected if said bicycle is characterized by having a normal seat tube.

3. A pet carrier assembly as claimed in claim 1, wherein said bars are made of metal and are strip-like in shape.

4. A pet carrier assembly as claimed in claim 1, wherein each of said side walls define a slot sized to engaged one of said fasteners.

5. A pet carrier assembly as claimed in claim 4, wherein said bars have a plurality of holes also sized for receiving said fasteners.

6. A pet carrier assembly as claimed in claim 1, wherein said bars are roughly the same length and are sufficiently long to permit gripping a portion of the bicycle adjacent a bottom bracket of the bicycle.

7. A pet carrier assembly as claimed in claim 1, wherein said first and second clamps each include openable opposed regions for gripping a bicycle tubular member therebetween and a fastener for closing said regions together.

8. A pet carrier assembly as claimed in claim 1, wherein each of said bars is slideably engageable with either of said side walls.

9. A pet carrier assembly as claimed in claim 1, wherein each of said bats is both slideably and pivotably engageable with either of said side walls.

10. A pet carrier assembly as claimed in claim 1, wherein said bars are roughly the same length and are both substantially shorter than said elongate member.

* * * * *

UNITED STATES PATENT AND TRADEMARK OFFICE
CERTIFICATE OF CORRECTION

| | | |
|---|---|---|
| PATENT NO. | : 7,174,852 B2 | Page 1 of 1 |
| APPLICATION NO. | : 11/424494 | |
| DATED | : February 13, 2007 | |
| INVENTOR(S) | : Malcolm Jefferson | |

It is certified that error appears in the above-identified patent and that said Letters Patent is hereby corrected as shown below:

On the Title Page, Item (73) Assignee should read

-- (73)   Assignee:   6319009 Canada Inc., Ottawa (CA) --.

Related U.S. Application Data should read

Item -- (62)   ~~Division~~ Continuation of application No. 11/148,498, filed on June 9, 2005. --.

Col. 1, Line 7, CROSS-REFERENCE TO RELATED APPLICATIONS should read

-- This application is a ~~divisional~~ continuation of U.S. application Ser. No. 11/148,498, filed on Jun. 9, 2005, which claims priority from Canadian Patent Application No. 2,471,149 to Jefferson, entitled "Attachment Facilitating Device for a Bicycle". --.

Signed and Sealed this

Fourth Day of November, 2008

JON W. DUDAS
*Director of the United States Patent and Trademark Office*